US011341641B2

(12) United States Patent
Nowicki et al.

(10) Patent No.: US 11,341,641 B2
(45) Date of Patent: May 24, 2022

(54) AERODYNAMICALLY STREAMLINED ENCLOSURE FOR INPUT DEVICES OF A MEDICATION PREPARATION SYSTEM

(71) Applicant: Becton, Dickinson and Company, Franklin Lakes, NJ (US)

(72) Inventors: Matthew Nowicki, Maywood, NJ (US); Christian Sandmann, Wayne, NJ (US)

(73) Assignee: Becton, Dickinson and Company, Franklin Lakes, NJ (US)

( * ) Notice: Subject to any disclaimer, the term of this patent is extended or adjusted under 35 U.S.C. 154(b) by 0 days.

(21) Appl. No.: 16/862,174

(22) Filed: Apr. 29, 2020

(65) Prior Publication Data
US 2020/0258228 A1 Aug. 13, 2020

Related U.S. Application Data

(63) Continuation of application No. 14/847,534, filed on Sep. 8, 2015, now Pat. No. 10,679,342.
(Continued)

(51) Int. Cl.
*G06T 7/00* (2017.01)
*H04N 5/225* (2006.01)
(Continued)

(52) U.S. Cl.
CPC ........... *G06T 7/0012* (2013.01); *G01G 21/28* (2013.01); *G05B 19/4155* (2013.01); *G06F 3/0482* (2013.01); *G06F 3/04817* (2013.01); *G06F 3/04842* (2013.01); *G06V 20/80* (2022.01); *H04N 5/225* (2013.01); *H04N 5/2252* (2013.01); *H04N 5/2256* (2013.01);
(Continued)

(58) Field of Classification Search
CPC ... G06T 7/0012; G01G 21/28; G06F 3/04817; G06F 3/0428; G06F 3/04842
See application file for complete search history.

(56) References Cited

U.S. PATENT DOCUMENTS 3,453,422 A 7/1969 Susor
3,551,353 A 12/1970 Chen et al.
(Continued)

FOREIGN PATENT DOCUMENTS

CA 2477259 A1 9/2003
EP 1803431 A1 7/2007
(Continued)

OTHER PUBLICATIONS

Scheraga, "Tech firms answer chain pharmacy's call for productivity", Drug Store News, 2003, pp. 31-32.
(Continued)

*Primary Examiner* — Jonathan R Messmore
(74) *Attorney, Agent, or Firm* — The Webb Law Firm

(57) ABSTRACT

A system for preparing a pharmaceutical compound comprises: a scale having a platen configured for placement of an object thereon; a supporting arm comprising a first end coupled to a portion of the scale and a second end extending to a position above the platen of the scale; and an enclosure housing extending from the second end of the supporting arm and configured to house at least one input device. The enclosure housing has a curved front profile to minimize flow disturbance when the system is positioned within a flow hood.

17 Claims, 8 Drawing Sheets

Related U.S. Application Data

(60) Provisional application No. 62/078,067, filed on Nov. 11, 2014, provisional application No. 62/077,968, filed on Nov. 11, 2014, provisional application No. 62/072,054, filed on Oct. 29, 2014, provisional application No. 62/072,160, filed on Oct. 29, 2014, provisional application No. 62/047,325, filed on Sep. 8, 2014.

(51) Int. Cl.

| | | |
|---|---|---|
| G01G 21/28 | (2006.01) | |
| G06V 20/80 | (2022.01) | |
| G05B 19/4155 | (2006.01) | |
| G06F 3/04817 | (2022.01) | |
| G06F 3/0482 | (2013.01) | |
| G06F 3/04842 | (2022.01) | |
| H04N 5/232 | (2006.01) | |
| G01G 19/00 | (2006.01) | |

(52) U.S. Cl.
CPC ......... *H04N 5/23229* (2013.01); *G01G 19/00* (2013.01); *G05B 2219/31313* (2013.01); *G05B 2219/35113* (2013.01); *G06T 2207/10004* (2013.01)

(56) References Cited

U.S. PATENT DOCUMENTS

| | | | |
|---|---|---|---|
| 3,584,204 | A | 6/1971 | Susor |
| 3,587,856 | A | 6/1971 | Lemelson |
| 3,627,423 | A | 12/1971 | Knapp |
| 3,734,286 | A | 5/1973 | Simjian |
| 3,914,058 | A | 10/1975 | Knapp et al. |
| 3,965,340 | A | 6/1976 | Renner et al. |
| 3,966,332 | A | 6/1976 | Knapp et al. |
| 3,970,643 | A | 7/1976 | Kee Woo et al. |
| 4,017,157 | A | 4/1977 | van Riet |
| 4,063,823 | A | 12/1977 | Grat |
| 4,087,184 | A | 5/1978 | Knapp et al. |
| 4,165,633 | A | 8/1979 | Raisanen |
| 4,273,816 | A | 6/1981 | Tollette |
| 4,277,089 | A | 7/1981 | Lockhart |
| 4,469,146 | A | 9/1984 | Campbell et al. |
| 4,476,381 | A | 10/1984 | Rubin |
| 4,549,205 | A | 10/1985 | Misaki et al. |
| 4,628,193 | A | 12/1986 | Blum |
| 4,653,010 | A | 3/1987 | Figler et al. |
| 4,655,026 | A | 4/1987 | Wigoda |
| 4,676,650 | A | 6/1987 | Bjorndal et al. |
| 4,676,776 | A | 6/1987 | Howson |
| 4,695,954 | A | 9/1987 | Rose et al. |
| 4,733,363 | A | 3/1988 | Yamada et al. |
| 4,790,118 | A | 12/1988 | Chilcoate |
| 4,804,273 | A | 2/1989 | Tondello et al. |
| 4,810,243 | A | 3/1989 | Howson |
| 4,829,650 | A | 5/1989 | Galard |
| 4,835,372 | A | 5/1989 | Gombrich et al. |
| 4,839,675 | A | 6/1989 | Owen |
| 4,847,764 | A | 7/1989 | Halvorson |
| 4,853,521 | A | 8/1989 | Claeys et al. |
| 4,857,716 | A | 8/1989 | Gombrich et al. |
| 4,860,899 | A | 8/1989 | McKee |
| 4,874,764 | A | 10/1989 | Ueda et al. |
| 4,879,650 | A | 11/1989 | Kurimoto et al. |
| 4,918,604 | A | 4/1990 | Baum |
| 4,972,657 | A | 11/1990 | McKee |
| 5,031,642 | A | 7/1991 | Nosek |
| 5,038,839 | A | 8/1991 | Morimoto et al. |
| 5,072,798 | A | 12/1991 | Franklin |
| 5,084,832 | A | 1/1992 | Yamada et al. |
| 5,088,981 | A | 2/1992 | Howson et al. |
| 5,094,786 | A | 3/1992 | Nagashima et al. |
| 5,153,827 | A | 10/1992 | Coutre et al. |
| 5,182,707 | A | 1/1993 | Cooper et al. |
| 5,184,753 | A | 2/1993 | Horak |
| 5,260,880 | A | 11/1993 | Tump |
| 5,261,546 | A | 11/1993 | van der Grift |
| 5,272,318 | A | 12/1993 | Rousso et al. |
| 5,308,930 | A | 5/1994 | Tokutu et al. |
| 5,317,506 | A | 5/1994 | Coutre et al. |
| 5,328,208 | A | 7/1994 | Garrison |
| 5,337,919 | A | 8/1994 | Spaulding et al. |
| 5,341,077 | A | 8/1994 | Chen et al. |
| 5,341,854 | A | 8/1994 | Zezulka et al. |
| 5,344,043 | A | 9/1994 | Moulding et al. |
| 5,348,061 | A | 9/1994 | Riley et al. |
| 5,365,343 | A | 11/1994 | Knapp |
| 5,390,796 | A | 2/1995 | Kerfoot, Jr. |
| 5,395,174 | A | 3/1995 | Koch et al. |
| 5,401,059 | A | 3/1995 | Ferrario |
| 5,404,227 | A | 4/1995 | Sumita et al. |
| 5,405,048 | A | 4/1995 | Rogers et al. |
| 5,416,706 | A | 5/1995 | Hagenbuch |
| 5,442,146 | A | 8/1995 | Bell et al. |
| 5,444,480 | A | 8/1995 | Sumita |
| 5,444,539 | A | 8/1995 | van der Grift |
| 5,468,110 | A | 11/1995 | McDonald et al. |
| 5,480,062 | A | 1/1996 | Rogers et al. |
| 5,502,944 | A | 4/1996 | Kraft et al. |
| 5,508,499 | A | 4/1996 | Ferrario |
| 5,516,475 | A | 5/1996 | Wilson |
| 5,523,560 | A | 6/1996 | Manique et al. |
| 5,568,262 | A | 10/1996 | LaChapelle et al. |
| 5,583,948 | A | 12/1996 | Shibayama |
| 5,593,267 | A | 1/1997 | McDonald et al. |
| 5,597,995 | A | 1/1997 | Williams et al. |
| 5,601,314 | A | 2/1997 | Burns et al. |
| 5,643,212 | A | 7/1997 | Coutre et al. |
| 5,651,775 | A | 7/1997 | Walker et al. |
| 5,713,485 | A | 2/1998 | Lift et al. |
| 5,719,679 | A | 2/1998 | Shimizu et al. |
| 5,720,154 | A | 2/1998 | Lasher et al. |
| 5,721,433 | A | 2/1998 | Kosaka |
| 5,747,744 | A | 5/1998 | Kraft et al. |
| 5,753,868 | A | 5/1998 | Diem |
| 5,758,095 | A | 5/1998 | Albaum et al. |
| 5,781,442 | A | 7/1998 | Engleson et al. |
| 5,797,515 | A | 8/1998 | Lift et al. |
| 5,833,866 | A | 11/1998 | Brown |
| 5,841,077 | A | 11/1998 | Kolaci |
| 5,841,541 | A | 11/1998 | Dlugos |
| 5,907,493 | A | 5/1999 | Boyer et al. |
| 5,940,176 | A | 8/1999 | Knapp |
| 5,963,136 | A | 10/1999 | O'Brien |
| 5,966,457 | A | 10/1999 | Lemelson |
| 5,969,317 | A | 10/1999 | Espy et al. |
| 5,979,512 | A | 11/1999 | McGregor et al. |
| 5,990,422 | A | 11/1999 | Komori et al. |
| 6,000,828 | A | 12/1999 | Leet |
| 6,005,959 | A | 12/1999 | Mohan et al. |
| 6,006,828 | A | 12/1999 | Kluth et al. |
| 6,068,156 | A | 5/2000 | Lift et al. |
| 6,113,578 | A | 9/2000 | Brown |
| 6,181,982 | B1 | 1/2001 | Yuyama et al. |
| 6,202,923 | B1 | 3/2001 | Boyer et al. |
| 6,234,964 | B1 | 5/2001 | Iliff |
| 6,330,491 | B1 | 12/2001 | Lion |
| 6,347,486 | B1 | 2/2002 | Badillet |
| 6,364,517 | B1 | 4/2002 | Yuyama et al. |
| 6,384,348 | B1 | 5/2002 | Haga et al. |
| 6,438,451 | B1 | 8/2002 | Lion |
| 6,466,879 | B1 | 10/2002 | Cantu et al. |
| 6,473,169 | B1 | 10/2002 | Dawley et al. |
| 6,478,147 | B1 | 11/2002 | Brander et al. |
| 6,535,637 | B1 | 3/2003 | Wootton et al. |
| 6,542,902 | B2 | 4/2003 | Dulong et al. |
| 6,551,391 | B1 | 4/2003 | Gerhardt et al. |
| 6,564,121 | B1 | 5/2003 | Wallace et al. |
| 6,574,580 | B2 | 6/2003 | Hamilton |
| 6,581,798 | B2 | 6/2003 | Lift et al. |
| 6,605,784 | B2 | 8/2003 | Eigenmann et al. |
| 6,694,334 | B2 | 2/2004 | DuLong et al. |

(56) References Cited

U.S. PATENT DOCUMENTS

| | | |
|---|---|---|
| 6,711,460 B1 | 3/2004 | Reese |
| 6,731,324 B2 | 5/2004 | Levy |
| 6,738,723 B2 | 5/2004 | Hamilton |
| 6,771,369 B2 | 8/2004 | Rzasa et al. |
| 6,775,602 B2 | 8/2004 | Gordon, Jr. et al. |
| 6,781,689 B2 | 8/2004 | Chiba |
| 6,810,355 B1 | 10/2004 | Kreidler et al. |
| 6,813,473 B1 | 11/2004 | Bruker |
| 6,814,255 B2 | 11/2004 | Left et al. |
| 6,816,625 B2 | 11/2004 | Lewis, Jr. et al. |
| 6,873,725 B2 | 3/2005 | Xu |
| 6,877,530 B2 | 4/2005 | Osborne et al. |
| 6,915,823 B2 | 7/2005 | Osborne et al. |
| 6,920,094 B2 | 7/2005 | Komaki |
| 6,922,652 B2 | 7/2005 | Edwards et al. |
| 6,937,339 B2 | 8/2005 | Yamazaki et al. |
| 6,970,094 B2 | 11/2005 | Yamashita et al. |
| 6,975,924 B2 | 12/2005 | Kircher et al. |
| 6,990,463 B2 | 1/2006 | Walter et al. |
| 6,995,664 B1 | 2/2006 | Darling |
| 6,998,542 B2 | 2/2006 | Wallisch |
| 7,006,893 B2 | 2/2006 | Hart et al. |
| 7,015,806 B2 | 3/2006 | Naidoo et al. |
| 7,017,622 B2 | 3/2006 | Osborne et al. |
| 7,017,623 B2 | 3/2006 | Tribble et al. |
| 7,028,723 B1 | 4/2006 | Alouani et al. |
| 7,070,097 B2 | 7/2006 | Blanford et al. |
| 7,096,212 B2 | 8/2006 | Fribble et al. |
| 7,107,106 B2 | 9/2006 | Engelson et al. |
| 7,117,902 B2 | 10/2006 | Osborne |
| 7,128,105 B2 | 10/2006 | Fribble et al. |
| 7,155,396 B2 | 12/2006 | Yuyama et al. |
| 7,163,035 B2 | 1/2007 | Khan et al. |
| 7,173,197 B1 | 2/2007 | Kasperek |
| 7,194,336 B2 | 3/2007 | DiGianfilippo et al. |
| 7,209,891 B1 | 4/2007 | Addy et al. |
| 7,230,529 B2 | 6/2007 | Ketcherside, Jr. et al. |
| 7,240,699 B2 | 7/2007 | Osborne et al. |
| 7,262,847 B2 | 8/2007 | Goodall et al. |
| 7,286,997 B2 | 10/2007 | Spector et al. |
| 7,297,108 B2 | 11/2007 | Iliff |
| 7,310,143 B2 | 12/2007 | Budd |
| 7,317,967 B2 | 1/2008 | DiGianfilippo et al. |
| 7,343,224 B2 | 3/2008 | DiGianfilippo et al. |
| 7,343,943 B2 | 3/2008 | Khan et al. |
| 7,357,045 B2 | 4/2008 | Rasmussen et al. |
| 7,363,115 B2 | 4/2008 | Anderson et al. |
| 7,375,294 B2 | 5/2008 | Kraft |
| 7,376,934 B2 | 5/2008 | Steinrisser et al. |
| 7,391,515 B2 | 6/2008 | Budd et al. |
| 7,427,002 B2 | 9/2008 | Liff et al. |
| 7,457,685 B2 | 11/2008 | D'Silva |
| 7,478,513 B2 | 1/2009 | Baldwin |
| 7,493,263 B2 | 2/2009 | Helmus et al. |
| 7,499,581 B2 | 3/2009 | Tribble et al. |
| 7,530,497 B2 | 5/2009 | Knowles et al. |
| 7,536,843 B2 | 5/2009 | Djurle et al. |
| 7,554,042 B2 | 6/2009 | Gregerson et al. |
| 7,555,557 B2 | 6/2009 | Bradley et al. |
| 7,560,720 B2 | 7/2009 | Voigt et al. |
| 7,581,953 B2 | 9/2009 | Lehmann et al. |
| 7,592,553 B2 | 9/2009 | Yuyama et al. |
| 7,597,247 B2 | 10/2009 | Helmin et al. |
| 7,599,516 B2 | 10/2009 | Limer et al. |
| 7,610,115 B2 | 10/2009 | Rob et al. |
| 7,620,479 B2 | 11/2009 | Kircher et al. |
| 7,620,563 B2 | 11/2009 | Tornaquindici |
| 7,620,568 B1 | 11/2009 | Parker-Malchak |
| 7,631,475 B2 | 12/2009 | Baldwin et al. |
| 7,633,018 B2 | 12/2009 | Leisinger et al. |
| 7,636,718 B1 | 12/2009 | Steen et al. |
| 7,643,134 B2 | 1/2010 | Berndt |
| 7,651,664 B2 | 1/2010 | Appoldt et al. |
| 7,681,606 B2 | 3/2010 | Khan et al. |
| 7,698,019 B2 | 4/2010 | Moncrief et al. |
| 7,706,915 B2 | 4/2010 | Mohapatra et al. |
| 7,734,478 B2 | 6/2010 | Goodall et al. |
| 7,753,085 B2 | 7/2010 | Tribble et al. |
| 7,765,108 B2 | 7/2010 | Goodall et al. |
| 7,769,221 B1 | 8/2010 | Shakes et al. |
| 7,771,659 B2 | 8/2010 | Ziegler |
| 7,801,642 B2 | 9/2010 | Ansari et al. |
| 7,814,731 B2 | 10/2010 | Bender et al. |
| 7,831,393 B2 | 11/2010 | Savva |
| 7,831,447 B2 | 11/2010 | Schuman |
| 7,837,103 B2 | 11/2010 | Suto |
| 7,845,551 B2 | 12/2010 | Helmin et al. |
| 7,847,970 B1 | 12/2010 | McGrady |
| 7,860,583 B2 | 12/2010 | Condurso et al. |
| 7,860,730 B1 | 12/2010 | Goodall et al. |
| 7,861,495 B2 | 1/2011 | Yuyama et al. |
| 7,873,435 B2 | 1/2011 | Yuyama et al. |
| 7,886,230 B2 | 2/2011 | Monnier et al. |
| 7,900,658 B2 | 3/2011 | Osborne et al. |
| 7,913,475 B2 | 3/2011 | Khan et al. |
| 7,913,720 B2 | 3/2011 | Tribble et al. |
| 7,917,329 B2 | 3/2011 | Hamamoto |
| 7,927,313 B2 | 4/2011 | Stewart et al. |
| 7,930,064 B2 | 4/2011 | Popovich, Jr. et al. |
| 7,930,066 B2 | 4/2011 | Eliuk et al. |
| 7,930,364 B2 | 4/2011 | Ramaswamy et al. |
| 7,937,290 B2 | 5/2011 | Bahir |
| 7,938,032 B2 | 5/2011 | Fernando |
| 7,941,915 B2 | 5/2011 | Yuyama et al. |
| 7,956,894 B2 | 6/2011 | Akers et al. |
| 7,964,805 B2 | 6/2011 | Yuyama et al. |
| 7,991,627 B2 | 8/2011 | Hutchinson et al. |
| 7,995,831 B2 | 8/2011 | Eller et al. |
| 8,024,913 B2 | 9/2011 | Khan et al. |
| 8,037,659 B2 | 10/2011 | Osborne et al. |
| 8,041,102 B2 | 10/2011 | Yuyama et al. |
| 8,073,238 B2 | 12/2011 | Nakanishi et al. |
| 8,140,349 B2 | 3/2012 | Hanson et al. |
| 8,140,351 B2 | 3/2012 | Tribble et al. |
| 8,140,395 B2 | 3/2012 | Murphy et al. |
| 8,151,835 B2 | 4/2012 | Khan et al. |
| 8,191,339 B2 | 6/2012 | Fribble et al. |
| 8,194,129 B2 | 6/2012 | Jones et al. |
| 8,209,941 B2 | 7/2012 | Osborne et al. |
| 8,219,413 B2 | 7/2012 | Martinez et al. |
| 8,220,503 B2 | 7/2012 | Fribble et al. |
| 8,224,483 B1 | 7/2012 | Ansari et al. |
| 8,229,763 B2 | 7/2012 | Laughland et al. |
| 8,234,128 B2 | 7/2012 | Martucci et al. |
| 8,266,878 B2 | 9/2012 | Luciano, Jr. et al. |
| 8,280,549 B2 | 10/2012 | Liff et al. |
| 8,284,305 B2 | 10/2012 | Newcomb et al. |
| 8,295,582 B2 | 10/2012 | Eller et al. |
| 8,301,410 B2 | 10/2012 | Chu et al. |
| 8,328,082 B1 | 12/2012 | Bochenko et al. |
| 8,345,989 B1 | 1/2013 | Bresolin et al. |
| 8,353,318 B2 | 1/2013 | Ranalletta et al. |
| 8,374,887 B1 | 2/2013 | Alexander |
| 8,374,965 B2 | 2/2013 | Friend et al. |
| 8,396,722 B2 | 3/2013 | Tanimoto et al. |
| 8,417,539 B2 | 4/2013 | Chapman et al. |
| 8,433,129 B2 | 4/2013 | Nakanishi et al. |
| 8,442,298 B2 | 5/2013 | Nakanishi et al. |
| 8,448,846 B2 | 5/2013 | Needhan et al. |
| 8,463,622 B2 | 6/2013 | Garms et al. |
| 8,477,989 B2 | 7/2013 | Bresolin |
| 8,489,425 B2 | 7/2013 | Moncrief et al. |
| 8,551,421 B2 | 10/2013 | Luchinger |
| 8,554,579 B2 | 10/2013 | Tribble et al. |
| 8,571,297 B2 | 10/2013 | Eller et al. |
| 8,571,881 B2 | 10/2013 | Rousso et al. |
| 8,571,886 B2 | 10/2013 | Chudy et al. |
| 8,678,047 B2 | 3/2014 | Tribble et al. |
| 8,682,047 B2 | 3/2014 | Lang et al. |
| 8,706,522 B2 | 4/2014 | Cohan et al. |
| 8,740,077 B2 | 6/2014 | Needham et al. |
| 8,763,651 B2 | 7/2014 | Stavsky et al. |
| 8,775,198 B2 | 7/2014 | Wiener et al. |
| 8,818,821 B2 | 8/2014 | Fioravanti |

(56) References Cited

U.S. PATENT DOCUMENTS

| | | | |
|---|---|---|---|
| 8,861,816 B2 | 10/2014 | Lang et al. |
| 8,869,297 B2 | 10/2014 | Hanov et al. |
| 8,881,980 B2 | 11/2014 | Magill |
| 8,908,163 B2 | 12/2014 | Young et al. |
| 8,958,112 B2 | 2/2015 | Matsui et al. |
| 8,989,895 B2 | 3/2015 | Holman et al. |
| 9,053,616 B2 | 6/2015 | Grabiner et al. |
| 9,121,751 B2 | 9/2015 | Michael |
| 9,138,693 B2 | 9/2015 | Aouad |
| 9,240,044 B2 | 1/2016 | Okuda et al. |
| 2001/0048027 A1 | 12/2001 | Walsh |
| 2002/0035412 A1 | 3/2002 | Kircher et al. |
| 2002/0057339 A1 | 5/2002 | Shoenfeld |
| 2002/0067411 A1 | 6/2002 | Thompson et al. |
| 2002/0100762 A1 | 8/2002 | Liff et al. |
| 2002/0139394 A1 | 10/2002 | Bronson |
| 2002/0145042 A1 | 10/2002 | Knowles et al. |
| 2003/0050731 A1 | 3/2003 | Rosenblum |
| 2003/0050802 A1 | 3/2003 | Jay et al. |
| 2003/0073349 A1 | 4/2003 | Nagao et al. |
| 2003/0074223 A1 | 4/2003 | Hickle et al. |
| 2003/0078849 A1 | 4/2003 | Snyder |
| 2003/0105555 A1 | 6/2003 | Lunak et al. |
| 2003/0107654 A1 | 6/2003 | Ohmura |
| 2003/0136590 A1 | 7/2003 | Gluvakov |
| 2003/0139701 A1 | 7/2003 | White et al. |
| 2003/0140928 A1 | 7/2003 | Bui et al. |
| 2003/0144878 A1 | 7/2003 | Wilkes et al. |
| 2003/0158508 A1 | 8/2003 | DiGianfilippo et al. |
| 2003/0179287 A1 | 9/2003 | Kozic et al. |
| 2003/0204357 A1 | 10/2003 | Hamilton |
| 2004/0017475 A1 | 1/2004 | Akers et al. |
| 2004/0076318 A1 | 4/2004 | Faeldt et al. |
| 2004/0143459 A1 | 7/2004 | Engleson et al. |
| 2004/0150815 A1 | 8/2004 | Sones et al. |
| 2004/0172289 A1 | 9/2004 | Kozic et al. |
| 2004/0193454 A1 | 9/2004 | Foote et al. |
| 2004/0204954 A1 | 10/2004 | Lacko |
| 2004/0225528 A1 | 11/2004 | Brock |
| 2005/0037485 A1 | 2/2005 | Rodgers et al. |
| 2005/0080651 A1 | 4/2005 | Morrison et al. |
| 2005/0086008 A1 | 4/2005 | DiGianfilippo et al. |
| 2005/0130173 A1 | 6/2005 | Leamon et al. |
| 2005/0197930 A1 | 9/2005 | Polarine |
| 2006/0080041 A1 | 4/2006 | Anderson et al. |
| 2006/0080177 A1 | 4/2006 | Walter et al. |
| 2006/0106647 A1 | 5/2006 | Brummel et al. |
| 2006/0136260 A1 | 6/2006 | Ash et al. |
| 2006/0136261 A1 | 6/2006 | Ash et al. |
| 2006/0136268 A1 | 6/2006 | Ash et al. |
| 2006/0173714 A1 | 8/2006 | Grotzinger |
| 2006/0200369 A1 | 9/2006 | Batch et al. |
| 2006/0238346 A1 | 10/2006 | Teller |
| 2006/0287884 A1 | 12/2006 | Sandy et al. |
| 2007/0021929 A1 | 1/2007 | Lemo et al. |
| 2007/0043473 A1 | 2/2007 | Anderson et al. |
| 2007/0106425 A1 | 5/2007 | Anderson et al. |
| 2007/0156707 A1 | 7/2007 | Fuchs et al. |
| 2007/0162295 A1 | 7/2007 | Akhtar et al. |
| 2007/0189597 A1 | 8/2007 | Limer et al. |
| 2007/0228172 A1 | 10/2007 | Knowles et al. |
| 2007/0239482 A1 | 10/2007 | Finn et al. |
| 2008/0045811 A1 | 2/2008 | Iliff |
| 2008/0047760 A1 | 2/2008 | Georgitsis |
| 2008/0052120 A1 | 2/2008 | Iliff |
| 2008/0052121 A1 | 2/2008 | Iliff |
| 2008/0052122 A1 | 2/2008 | Iliff |
| 2008/0052123 A1 | 2/2008 | Iliff |
| 2008/0052130 A1 | 2/2008 | Iliff |
| 2008/0052132 A1 | 2/2008 | Iliff |
| 2008/0086326 A1 | 4/2008 | Moura et al. |
| 2008/0105468 A1 | 5/2008 | Ragazzini et al. |
| 2008/0125897 A1 | 5/2008 | DiGanfilippo et al. |
| 2008/0195416 A1 | 8/2008 | Tribble et al. |
| 2008/0312861 A1 | 12/2008 | Casto et al. |
| 2009/0110019 A1 | 4/2009 | Houde-Walter et al. |
| 2009/0154764 A1 | 6/2009 | Khan et al. |
| 2009/0154789 A1 | 6/2009 | Wolfe |
| 2009/0202108 A1 | 8/2009 | Faeldt et al. |
| 2009/0265185 A1 | 10/2009 | Finn et al. |
| 2009/0323108 A1 | 12/2009 | Shimma |
| 2009/0326861 A1 | 12/2009 | Langford et al. |
| 2010/0057264 A1 | 3/2010 | Kircher et al. |
| 2010/0094653 A1* | 4/2010 | Tribble ............... G06Q 10/08 705/3 |
| 2010/0324936 A1 | 12/2010 | Vishnubhatla et al. |
| 2011/0029445 A1 | 2/2011 | Whittacre et al. |
| 2011/0031038 A1 | 2/2011 | Page |
| 2011/0073656 A1* | 3/2011 | Detwiler ............ G06K 7/10722 235/462.41 |
| 2011/0184751 A1 | 7/2011 | Holmes |
| 2011/0202366 A1 | 8/2011 | Akers et al. |
| 2011/0234977 A1 | 9/2011 | Verdooner |
| 2011/0267465 A1 | 11/2011 | Alexander et al. |
| 2011/0307270 A1 | 12/2011 | Berkelhamer et al. |
| 2012/0010840 A1 | 1/2012 | Fankhauser et al. |
| 2012/0041778 A1 | 2/2012 | Kraft |
| 2012/0065987 A1 | 3/2012 | Farooq et al. |
| 2012/0330684 A1 | 12/2012 | Jacobs et al. |
| 2013/0018356 A1 | 1/2013 | Prince et al. |
| 2013/0054256 A1 | 2/2013 | Holman et al. |
| 2013/0142406 A1* | 6/2013 | Lang .................. G06K 9/6293 382/128 |
| 2013/0172863 A1 | 7/2013 | Hakomori et al. |
| 2013/0194414 A1 | 8/2013 | Poirier et al. |
| 2013/0271796 A1 | 10/2013 | Landa |
| 2014/0025206 A1 | 1/2014 | Matsui et al. |
| 2014/0157169 A1 | 6/2014 | Kikin-Gil |
| 2015/0272320 A1 | 10/2015 | Ranalletta et al. |

FOREIGN PATENT DOCUMENTS

| | | |
|---|---|---|
| GB | 2379037 A | 2/2003 |
| JP | H04369822 A | 12/1992 |
| JP | 2005211541 A | 8/2005 |
| JP | 3186063 U | 9/2013 |
| JP | 2013238493 A | 11/2013 |
| JP | 201436791 A | 2/2014 |
| WO | 8700659 A1 | 1/1987 |
| WO | 03040980 A1 | 5/2003 |
| WO | 2006095850 A1 | 9/2006 |
| WO | 2008062485 A1 | 5/2008 |
| WO | 2012008393 A1 | 1/2012 |
| WO | 2012095279 A2 | 7/2012 |
| WO | 2014065872 A1 | 5/2014 |

OTHER PUBLICATIONS

ScriptPro, SP 200 with Collating Control Center Robotic Prescription Dispensing System, Available online as of Feb. 2004.

ScriptPro, SP 200 Robotic Prescription Dispensing System, Available online as of Feb. 2004.

ScriptPro, SP Automation Center 200TM (Space 200TM) Prescription Dispensing Automation Center, Available online as of Feb. 2004.

Seifert et al., "The Training of a Telepharmacist Addressing the Needs of Rural West Texas", American Journal of Pharmaceutical Education, 2004, pp. 1-9, vol. 68, No. 3.

Texas Administrative Code, Title 22, Examining Boards.

Tracy et al., Telemedicine Technical Assistance Documents "A Guide to Getting Started in Telemedicine", 2004, University of Missouri—School of Medicine, pp. 206-240.

Ukens, "Pharmacist shortage boosts telepharmacy", Drug Topics, 2002, p. 53, vol. 146, No. 11.

United States Pharmacopeia, Chapter 797, The National Formulary, 2004, United States Pharmacopeial Convention, Inc., Rockville, MD.

Wills, "Drug Images and Drug Imprints: Delivering Tools for Accuracy in Your Pharmacy", Insights, 2004, p. 7.

Woodall, "Remote Order Entry and Video Verifications: Reducing After-Hours Medication Error in a Rural Hospital", Joint Commis-

(56) References Cited

OTHER PUBLICATIONS sion Journal on Quality and Safety, 2004, pp. 442-447, vol. 30, No. 8.
Yahoo Mail, Oct. 1, 2002, pp. 1-3.
Young, "Loan repayments help pharmacists provide care in medically underserved areas", American Journal Health-System Pharmacy, 2003, pp. 2186-2188, vol. 60.
Alexander, U.S. Appl. No. 11/056,511, filed Feb. 11, 2005.
Alexander, Office Action from U.S. Appl. No. 11/056,511, filed Apr. 8, 2008, pp. 1-12.
Alexander, Office Action from U.S. Appl. No. 11/056,511, filed Oct. 16, 2008, pp. 1-17.
Alexander, Office Action from U.S. Appl. No. 11/056,511, filed Apr. 13, 2009, pp. 1-14.
Alexander, Office Action from U.S. Appl. No. 11/056,511, filed Feb. 3, 2010, pp. 1-15.
Alexander, U.S. Appl. No. 13/097,575, filed Apr. 29, 2011.
Alexander, Notice of Allowance from U.S. Appl. No. 11/056,511, filed Dec. 24, 2012, pp. 1-16.
Anderson, "A Narrative on the History of the Development of Telepharmacy in North Dakota From the Board of Pharmacy's Perspective Recorded by Excerpts from Board Minutes", North Dakota State Board of Pharmacy, 2006, pp. 1-5.
Angaran, "Telemedicine and telepharmacy: Current status and future implications", American Journal of Health-System Pharmacy, 1999, pp. 1405-1426, vol. 56, No. 14.
Anonymous, "Pharmacy Annual Report-Chains covet customized pharmacy integration", Drug Store News, 2003, pp. 73-75, vol. 25, No. 10.
Bynum et al., "The Effect of Telepharmacy Counseling on Metered-Dose Inhaler Technique among Adolescents with Asthma in Rural Arkansas", Telemedicine Journal and e-Health, 2001, pp. 207-218, vol. 7, No. 3.
Cabral, Jr. et al., "Multimedia Systems for Telemedicine and Their Communications Requirements", IEEE Communications Magazine, 1996, pp. 20-27.
Cardinal Health Pharmacy Resources, "Improving after-hour pharmacy services for a community hospital by a remote pharmacy", 2003, Cardinal Health Inc., Houston Texas.
Casey et al., "Access to Rural Pharmacy Services In Minnesota, North Dakota, and South Dakota", University of Minnesota Rural Health Research Center—Working Paper 36, 2001, pp. 1-76.
Casey et al., "Pharmacist Staffing and the Use of Technology in Small Rural Hospital: Implications for Medication Safety", Upper Midwest Rural Health Research Center, 2005, pp. 1-43.
Clifton et al., "Provision of pharmacy services to underserved populations via remote dispensing and two-way videoconferencing". Am. J. Health-Syst. Pharm, 2003, pp. 2577-2582, vol. 60.
Dakota Legislative Assembly, "Article 61-07 Hospital Pharmacy", Apr. 1, 1988.
Dakota Legislative Assembly, "Article 61-02-08-08 Telepharmacy in Hospitals", Dec. 1, 2003.
Dart, "Telepharmacy project offers a dose of technology", North Dakota Living, 2003, pp. 10-11.
Dart, "Digital Doses-Telepharmacies save people in small towns and rural areas from having to drive hundreds of miles to fill a prescription", Rural Electric, 2005, pp. 28-31.
Exactamix, "Compounding Solutions: An advanced system for multi-ingredient solution compounding", 2016, Baxter International Inc., Illinois, pp. 1-12.
Felkey, "Tools for Interactive Telepharmacy", Computer Talk, 2001, pp. 43-45.

Felkey, "Integrating Technology . . . at the Point of Care", Insight, 2004, pp. 8-10.
First Consulting Group, "Regulatory Compliance News Summary now includes global pharmaceutical regulatory news", 2004, pp. 1-7.
Frady, "What's New in RxCare Plus 17.2", Insight, 2001, p. 14.
Ghent, "Pharmacists to digital to fight shortage", Pharmacy Practice, 2004, pp. 47-48, vol. 20, No. 11.
Halversoan, "Innovative Healthcare Information Technology Solutions for Rural Americans", Rural Wisconsin Health Cooperative, 2001, pp. 1-49.
Hix, "Outpatient Pharmacies "Booming": An Inside Look at the Growth of an Industry", Insight, 2004, pp. 14-17.
Horns, "cytostatic programs", Pharmweb Internet Posting by Hank & Horns Software, Jan. 1999, pp. 1-3.
Kastango et al., "USP chapter 797: Establishing a practice standard for compounding sterile preparations in pharmacy", American Journal Health-System Pharmacy, 2004, pp. 1928-1938, vol. 61.
Keeys et al., "Providing nighttime pharmaceutical services through telepharmacy", American Journal Health-System Pharmacy, 2002, pp. 716-721, vol. 59.
Kosub, "Device allows pharmacy care in remote areas", Pharmacy Practice, 2004, pp. 12-13, vol. 20, No. 10.
Koutnik, "The Pharmacy of Tomorrow", Pharmacy Times, 2003, 3 pages.
Langham, "Taking Automation to New Levels", Insight, 2002, pp. 4-5.
Lustig, "Medication error prevention by pharmacists—An Israeli solution", Pharmacy World & Science, 2002, pp. 21-25, vol. 22, No. 1.
MacInnis et al., "Environmental Scan of Pharmacy Technicians", 2001, Canadian Pharmacists Association, Ottawa, ON, pp. 1-16.
Morris, et al. "National survey of quality assurance activities for pharmacy-compounded sterile preparations", American Journal Health-System Pharmacy, 2003, pp. 2567-2576, vol. 601.
Muller, "Electronic Prescribing What You Need to Know!", Insight, 2002, pp. 10-12.
Muller, "Make Your Next Move QS/1's Premium Pharmacy", Insight, 2003, pp. 13-15.
Napoli et al., "Picture archiving and communication in radiology", Rays, 2003, vol. 28, No. 1, Abstract Only.
Nissen et al., "Can telepharmacy provide pharmacy services in the bush?", Journal of Telemedicine and Telecare, 2003, pp. 39-41, vol. 9, Supplement 2.
North Dakota State Board of Pharmacy Practice Act 2003.
Parks, "Using central-fill to maximize dispensing", Drug Store News, 2001, pp. 51, 75, vol. 23, No. 11.
Parks, "ATM-Style Drug Dispensers Taking Hold in Areas With Limited Pharmacist Services", Pharmacy Practice News, 2004, 6 pages, vol. 31, No. 01.
Peterson, "The North Dakota Telepharmacy Project: Restoring and Retaining Pharmacy Services in Rural Communities", Pharmacy Technology, 2004, pp. 28-39, vol. 20.
Petition for Inter Partes Review of U.S. Pat. No. 8,374,887, 2015.
Phillips, "Telepharmacy at Texas Tech", Apr. 2003 Presentation, Texas Tech University Health Sciences Center.
"Reference Manual for Computer Aided Therapy for Oncology", 2005, Cato Research, North Carolina, pp. 1-255.
Rouse et al., "White paper on pharmacy technicians 2002: Needed Changes can no longer wait", American Journal Health-System Pharmacy, 2003, pp. 37-51, vol. 60.
"Rural Hospital Joins the Big Leagues with the Power of a Kodak PAS/Enterprise Information Management (EIM) Solution", Kodak Medical Systems, 2005.

\* cited by examiner

FIG. 10A — MEDIUM SIZED, RELATIVELY BLUNT ENCLOSURE
FIG. 10B — EXPERIMENTAL ASSESSMENT: NA, EXPERIMENTS NOT PERFORMED
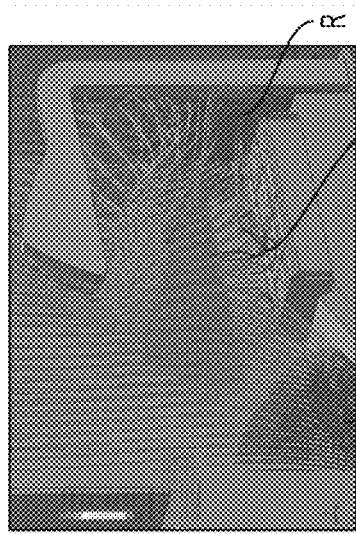
FIG. 9A — LARGE, RELATIVELY BLUNT ENCLOSURE
FIG. 9B — EXPERIMENTAL ASSESSMENT: STABILITY (+/-) = 0.06g / ACCURACY (+/-) = NA, TOO UNSTABLE
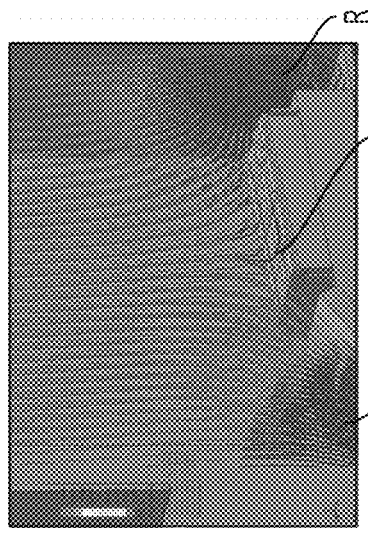
FIG. 8A — NO ENCLOSURE, IDEAL FLOW CONDITIONS
FIG. 8B — EXPERIMENTAL ASSESSMENT: STABILITY (+/-) = 0.00g / ACCURACY (+/-) = 0.0229g

MEDIUM SIZED, RELATIVELY STREAMLINED ENCLOSURE

SMALL SIZED, VERY STREAMLINED ENCLOSURE

MEDIUM SIZED BUT SHORT, RELATIVELY STREAMLINED ENCLOSURE

EXPERIMENTAL ASSESSMENT:
STABILITY (+/-) = 0.02g / ACCURACY (+/-) = .0445g

EXPERIMENTAL ASSESSMENT:
STABILITY (+/-) = 0.015g / ACCURACY (+/-) = .0297g

EXPERIMENTAL ASSESSMENT:
STABILITY (+/-) = 0.01g / ACCURACY (+/-) = .0153g

AERODYNAMICALLY STREAMLINED ENCLOSURE FOR INPUT DEVICES OF A MEDICATION PREPARATION SYSTEM

CROSS REFERENCE TO RELATED APPLICATIONS

This application is a continuation of U.S. application Ser. No. 14/847,534, filed Sep. 8, 2015, entitled "Aerodynamically Streamlined Enclosure for Input Devices of a Medication Preparation System", which claims priority to U.S. Provisional Application Ser. No. 62/047,325, filed Sep. 8, 2014, entitled "Automated Visual Documentation Feature with Minimal User Input", U.S. Provisional Application Ser. No. 62/072,160, filed Oct. 29, 2014, entitled "Enhanced Pharmacist Review Module for a System for Preparing a Pharmaceutical Compound", U.S. Provisional Application Ser. No. 62/072,054, filed Oct. 29, 2014, entitled "Aerodynamically Streamlined Enclosure for Input Devices of a Medication Preparation System", U.S. Provisional Application Ser. No. 62/078,067, filed Nov. 11, 2014, entitled "Aerodynamically Streamlined Enclosure for Input Devices of a Medication Preparation System", and U.S. Provisional Application No. 62/077,968, filed Nov. 11, 2014, entitled "Enhanced Platen for Pharmaceutical Compounding", the entire disclosures of each of which are hereby incorporated by reference.

BACKGROUND OF THE INVENTION

Field of the Invention

The present invention is generally directed to an aerodynamically streamlined enclosure for housing input devices, such as a scanner and/or camera, which are part of a medication preparation system. The streamlined enclosure may be placed within a flow hood and may be positioned in the upstream airflow vicinity of a scale.

Description of Related Art

The preparation of sterile pharmaceutical compounds typically takes place in a flow hood that provides an air stream to create a clean zone. During such preparations, cameras, scanners, and/or scales may be utilized to document the preparation. These devices are typically located in a flow hood and are positioned in the upstream air flow vicinity of a scale. However, any object will create an air flow disturbance that will affect the downstream air flow of the object. If this flow disturbance is present in the upstream vicinity of a scale, for instance, it can result in inconsistent pressure or turbulent flow conditions in the vicinity of the scale's weighing surface. Depending on the level of flow disturbance, which is a function of multiple form parameters and location, this may result in the scale being unable to stabilize at all. A scale that cannot stabilize, may not be used to accurately prepare a medication, such as a sterile compounded medication. In certain cases, the flow disturbance may result in accuracy tolerances that are beyond the acceptable limits of the system for medication preparation.

Accordingly, a need exists for a smaller and/or more streamlined device that will result in a smaller flow disturbance near a scale of the system to create a higher likelihood of meeting accuracy and stability requirements.

SUMMARY OF THE INVENTION

In accordance with an aspect of the invention, provided is a system for preparing a pharmaceutical compound. The system comprises: a scale having a platen configured for placement of an object thereon; a supporting arm comprising a first end coupled to a portion of the scale and a second end extending to a position above the platen of the scale; and an enclosure housing extending from the second end of the supporting arm and configured to house at least one input device. The enclosure housing has a curved front profile to minimize flow disturbance when the system is positioned within a flow hood.

The enclosure housing may be formed of an upper portion and a lower portion. In addition, the enclosure housing may comprise a first end coupled to the second end of the supporting arm and a second end extending over the platen of the scale. At least a portion of the second end of the enclosure housing may have a height that is greater than a height of at least a portion of the first end of the enclosure housing.

The at least one input device may include an image capture device, a barcode scanner, or both. If both an image capture device and a barcode scanner are provided within the enclosure housing, the barcode scanner may be angled, such as at a 45° angle with respect to a field of view of the image capture device, with respect to the image capture device within the enclosure housing.

In accordance with another aspect of the invention, provided is a system for preparing a pharmaceutical compound. The system comprises: a computing device comprising a processor and a user interface providing an operator with instructions for preparing the pharmaceutical compound; a scale operatively coupled to the processor of the computing device; and an enclosure housing comprising an image capture device and a barcode scanner. The enclosure housing is supported by a supporting arm and coupled to a portion of the scale. The image capture device is operatively connected to the processor of the computing device and has a field of view positioned to capture an object positioned on the scale. The barcode scanner has a sensor that is offset from the scale.

The barcode scanner may be angled with respect to the image capture device within the enclosure housing. For instance, the barcode scanner may be angled at a 45° angle with respect to the field of view of the image capture device. The enclosure housing may be supported by the supporting arm such that the enclosure housing is positioned above the scale. The enclosure housing may have a curved front profile to minimize flow disturbance within a flow hood.

In accordance with yet another aspect of the invention, provided is a system for preparing a pharmaceutical compound. The system comprises: a computing device comprising a user interface providing an operator with instructions for preparing the pharmaceutical compound; and a flow hood having positioned therein: a scale operatively connected to the user interface; and an enclosure housing comprising a camera positioned to capture an image of the scale during the preparation of the pharmaceutical compound.

The enclosure housing may be positioned above the scale. The enclosure housing may further comprise a barcode scanner. The enclosure housing may have a curved front profile to minimize flow disturbance within the flow hood.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

BRIEF DESCRIPTION OF THE DRAWINGS

FIG. 8A is a perspective visual representation of the air flow distribution within a flow hood having a scale and no enclosure.

FIG. 8B is a side view visual representation of the air flow distribution within a flow hood having a scale and no enclosure.

FIG. 9A is a perspective visual representation of the air flow distribution within a flow hood having a scale and a large blunt enclosure.

FIG. 9B is a side view visual representation of the air flow distribution within a flow hood having a scale and a large blunt enclosure.

FIG. 10A is a perspective visual representation of the air flow distribution within a flow hood having a scale and a medium sized blunt enclosure.

FIG. 10B is a side view visual representation of the air flow distribution within a flow hood having a scale and a medium sized blunt enclosure.

DESCRIPTION OF THE INVENTION

Figure 1:
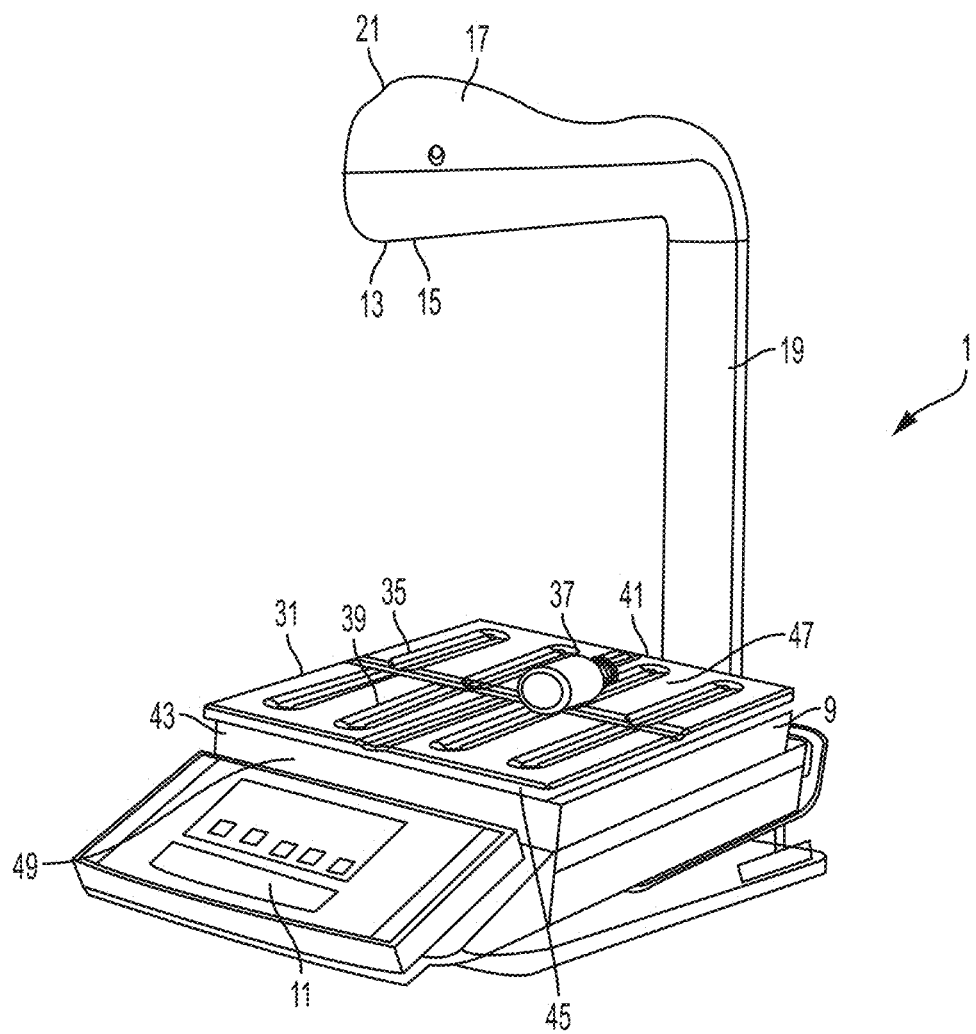
FIG. 1 is a perspective view of an exemplary pharmacy preparation system for preparing a pharmaceutical compound in accordance with an embodiment of the present invention.

For purposes of the description hereinafter, the terms "upper", "lower", "right", "left", "vertical", "horizontal", "top", "bottom", "lateral", "longitudinal", and derivatives thereof, shall relate to the invention as it is oriented in the drawing figures. However, it is to be understood that the invention may assume various alternative variations, except where expressly specified to the contrary. It is also to be understood that the specific devices illustrated in the attached drawings, and described in the following specification, are simply exemplary embodiments of the invention. Hence, specific dimensions and other physical characteristics related to the embodiments disclosed herein are not to be considered as limiting.

The invention is directed to an aerodynamically streamlined enclosure to house input devices, such as a scanner and/or a camera, that are part of a medication preparation system, such as a sterile drug compounding system. These devices are typically located in a flow hood and are positioned in the upstream air flow vicinity of a scale. The aerodynamically streamlined enclosure is designed in such a way to minimize the airflow disturbance that is created by having a device in a laminar airflow stream. This configuration allows the device to be placed in the upstream vicinity of a scale and still have an acceptable gravimetric accuracy (i.e. +/−0.05 g) and stabilization time (i.e. no more than 2 additional seconds) for verifying medication preparation purposes.

Any object will create an air flow disturbance that will affect the downstream air flow of the object. If this flow disturbance is present in the upstream vicinity of a scale it can result in inconsistent pressure or turbulent flow conditions in the vicinity of the scale's weighing surface. Depending on the level of flow disturbance, which is a function of multiple form parameters and location, this may result in the scale being unable to stabilize at all. A scale that cannot stabilize, may not be used to accurately prepare a medication, such as a sterile compounded medication. In certain cases, the flow disturbance may result in accuracy tolerances that are beyond the acceptable limits of the system for medication preparation.

A smaller and/or more streamlined device will result in a smaller flow disturbance and therefore a higher likelihood of meeting accuracy and stability requirements. The streamlined enclosure of the present invention has a form that minimizes flow disruption and drag, allowing for stable and accurate enough gravimetric readings that are required for medication preparation purposes. The streamlined enclosure of the present invention allows for required gravimetric scale accuracy and stability, while placing the input devices in the upstream airflow vicinity relative to the scale. Placing these objects (i.e. scanner and/or camera) within the scale vicinity is typically the ideal area for a number of reasons. A secondary advantage to the streamlined enclosure of the present invention is to provide and maintain a clean working environment for the sterile preparation of medications. In use, the purpose of the air stream in a flow hood is to create a clean zone for sanitary reasons. A turbulent zone created by objects near, or upstream, of the airflow may result in a potential contamination hazard during medication preparation. As a result, having an aerodynamically shaped enclosure housing for input devices minimizes the amount of laminar airflow disruption and decreases the chances of any type of contamination.

In accordance with one aspect of the present invention, a single enclosure houses at least one input device above the scale. The enclosure may house multiple input devices above the scale, such as a scanner and a camera. The enclosure is small and streamlined enough so that it has minimal effects on the stability and accuracy of the scale.

In certain cases, the input device enclosure may be positioned to the side or back of the scale and not directly provided in the upstream vicinity of the scale's weighing surface relative to airflow direction. This configuration may provide stable and accurate gravimetric scale readings since disturbed airflow would not reach the weighing surface vicinity of the scale, however, the input device would be provided in a less than ideal location. For example, if the input device is a camera, this side or back placement of the camera would most likely require photographs to be taken in a perspective view. If the input device is a scanner, this side or back placement would provide the scanner in a potentially less ergonomic location for use by a user.

In other cases, the input device may have a small enough footprint to be suitable for use without any enclosure. This configuration may provide efficient ergonomic scanning and the ability to have pictures taken from a direct top down view. This configuration may require that the housing of the device itself be optimized to provide little disruption to the air flow.

In still other cases, positioning an input device above the scale but in an orientation and/or with aid from additional air flow manipulating features could result in air that is sufficiently channeled away from the scale weighing surface so as to not have an appreciable effect on gravimetric readings of the scale. Similarly, additional airflow manipulating features could be designed to reorient disturbed air sufficiently such that when the air hits the scale weighing surface it is sufficiently deflected and/or dampened such that it does not adversely affect the stability and accuracy of the scale.

In another configuration, an enclosure may be provided around the scale so as to eliminate any type of potential airflow disturbance to gravimetric readings (i.e. a box housing used with high accuracy scales). A blunt, non-aerodynamic enclosure for the scale could fulfill gravimetric stability and accuracy requirements under a limited number of hoods since airflow patterns and flow rates vary between hoods.

In yet another configuration, a scale may be provided with high filtering for noisy environments or processing the gravimetric signal outside of the scale's logic system. This configuration could be used as a solution to achieving more accurate and stable results with blunt or non-streamlined objects.

In still another configuration, a platen of the scale may be provided in a way that minimizes the effects of airflow disturbances on the reading of the scale. Raising the device high enough above the scale could be a solution to achieving more accurate and stable results with blunt or non-streamlined objects.

The degree of sensitivity that a scale has under a typical hood used in sterile compounding is on the order of (+/−0.05 g) for a down flow rate of 55-80 cfm. To understand why this is the case, the pressure that is seen on the weighing surface of the scale and its relationship to the desired level of accuracy needs to be understood. According to simulations, the pressure that the platen (weighing surface of the scale) experiences ranges from −1.2 Pa to 0.1 Pa, with an average of approximately −0.07 Pa. To gain an accuracy of +/−0.05 g a deviation of no more than +/−0.0126 Pa can be experienced by the scale due to airflow disturbances. This is extremely small compared to the overall range of pressure that the scale experiences. Qualitatively, this magnitude is so small that a user's hand moving in the vicinity of a surface can easily induce enough air movement to result in a much greater pressure disturbance. As a result, parameters such as form location within the hood (different flow patterns in different areas) and hood brands/models were realized to have a great enough influence on the performance of the scale's stability and accuracy.

Figure 2:
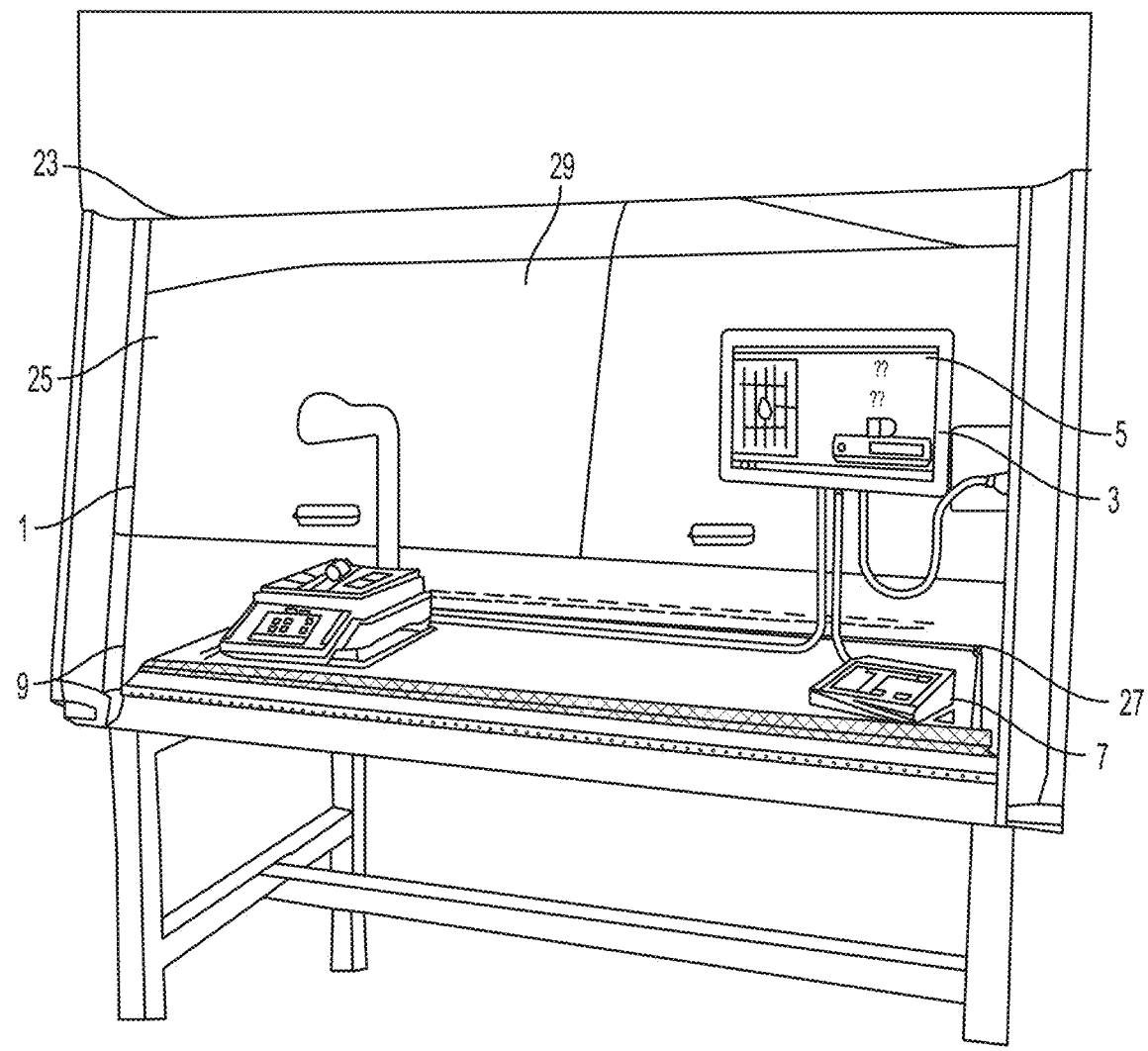
FIG. 2 is a perspective view of the pharmacy preparation system of FIG. 1 in a laminar flow hood having a user interface in accordance with an embodiment of the present invention.

With reference to FIGS. 1-2, a pharmacy preparation system, denoted generally as reference numeral 1, assists pharmacists or non-pharmacist technicians in preparing a syringe, drug vial, or intravenous (IV) bag with one or more prescribed pharmaceutical compounds. The pharmacy preparation system is operatively connected to a user interface 3 including a computer having a processor and a stored memory, as well as a display 5 and a user input device 7, such as a keyboard, mouse, etc. A scale 9 having a scale output interface 11 may be operatively connected to the processor of the user interface 3. The scale 9 may be implemented as any suitable device for detecting a change in mass or weight when an object is placed thereon. Accordingly, the scale 9 may simply be configured as a device that sends a signal when the mass or weight of an object is greater or less than a predetermined threshold or a high-precision scale that provides an accurate reading of the weight of an object placed thereon.

In one embodiment, a barcode scanner 13 may be operatively connected to at least one of the processor of the user interface 3 and the scale 9, such that the barcode scanner 13 may scan a medication vial having a barcode that is placed onto a portion of the scale 9. In another embodiment, an image capture device 15 may be operatively connected to at least one of the user interface 3 and the scale 9, such that the image capture device 15 may take a picture of an item, such as a medication vial, IV bag, or syringe placed onto a portion of the scale 9. In one embodiment, the image capture device 15 may capture a plurality of still images or running video of items placed onto a portion of the scale 9 throughout the medication compounding process for documentation and/or subsequent review of the medication compounding process.

In still another embodiment, at least one of the barcode scanner 13 and the image capture device 15 may be at least partially enclosed within a housing 17. In certain configurations, the housing 17 may fully enclose the barcode scanner 13 and the image capture device 15. Optionally, the housing 17 may include only one of the barcode scanner 13 and the image capture device 15. In one configuration, the barcode scanner 13 may be positioned within the housing 17 such that the barcode scanner 13 may easily scan a barcode of an item placed onto a portion of the scale 9 without further manipulation by the user. In another configuration, the image capture device 15 may be positioned within the housing 17 such that the image capture device may easily capture images of an item placed onto a portion of the scale 9 without further manipulation by the user.

Figure 3:
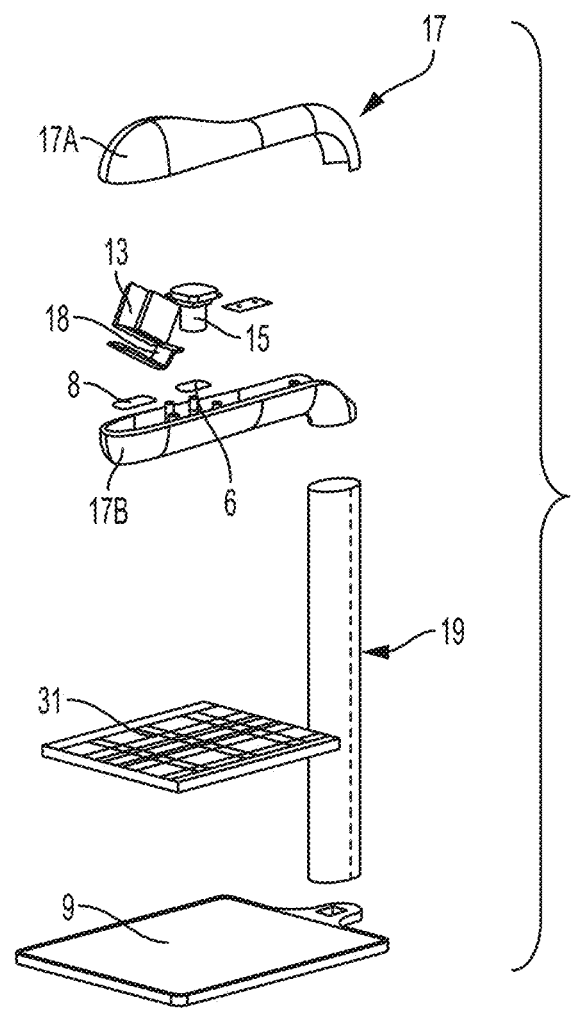
FIG. 3 is an exploded perspective view of a portion of the pharmacy preparation system of FIG. 1 in accordance with an embodiment of the present invention.

With specific reference to FIG. 3, the housing 17 may be formed of an upper portion 17A and a lower portion 17B which are interfaced to provide minimal surface perturbations to minimize any surface adherence of contaminants such as microbes or other pathogens. In one embodiment, the manufacturing of the housing 17 adheres to USP 797.

Optical lenses 6, 8 may be fitted with the housing 17 to further ensure adherence to USP 797. In one configuration, optical lens 6 may be fitted with housing 17 in optical communication with image capture device 15. In another configuration, optical lens 8 may be fitted with housing 17 in optical communication with barcode scanner 13.

In one configuration, the barcode scanner 13 may be positioned within the housing 17 such that the barcode scanner 13 has a scanner that is offset from immediately scanning a barcode of an item placed onto a portion of the scale 9 without further manipulation by the user. In this configuration, accidental scanning is avoided. As shown in FIG. 3, the barcode scanner 13 may be positioned such that the sensor is angled with respect to a platen 31 of the scale, such as at a 45° angle by a mounting bracket 18. In this configuration, the user must actively place the objects to be scanned in range of the sensor of the barcode scanner 13. In another configuration, the image capture device 15 may be positioned within the housing 17 such that the image capture device may easily capture images of an item placed onto a portion of the scale 9 without further manipulation by the user.

The housing 17 may be positioned above a portion of the scale 9, such as supported by a supporting arm 19. As shown in FIG. 2, the pharmacy preparation system 1 may be positioned within a laminar flow hood 25 having an inlet air source 23 and an outlet air port 27 for creating a laminar flow of air within an interior 29 of the laminar flow hood 25. An exterior surface 21 of the housing 17 may have a curved front profile as shown in FIGS. 1-3 to provide it with a streamlined shape and/or a profile which is optimized to reduce disruption of the flow of air within the laminar flow hood 25.

Figure 4:
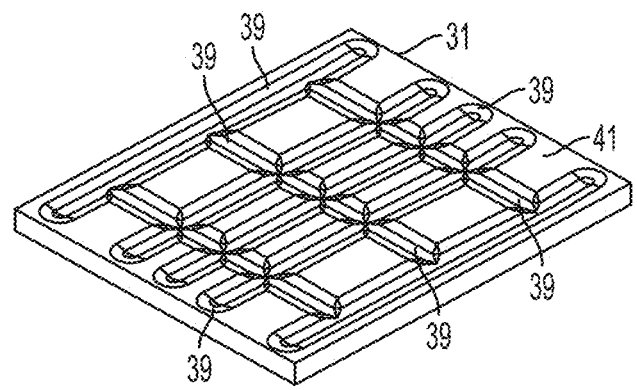
FIG. 4 is a perspective view of a scale platen in accordance with an embodiment of the present invention.
Figure 5:
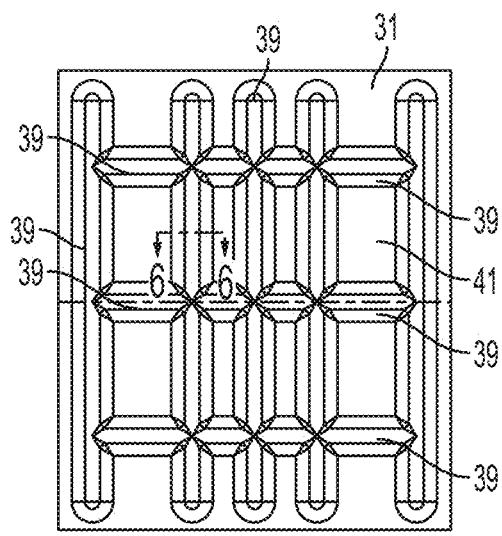
FIG. 5 is a top view of the scale platen of FIG. 4 in accordance with an embodiment of the present invention.
Figure 6:
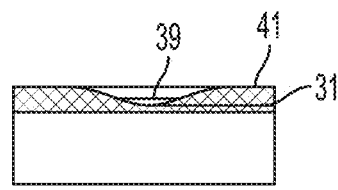
FIG. 6 is a cross-sectional side view of a groove of the scale platen of FIG. 4 taken along line D-D of FIG. 5 in accordance with an embodiment of the present invention.

Referring again to FIGS. 1-3, the scale 9 may include a base portion 43 which supports a platen 31 thereon. The base portion 43 houses a strain gauge load cell which measures the strain of an object placed on the platen 31, and a force transducer, such as a load cell sensor, which converts the force applied to the platen 31 into an electrical signal which may be relayed to the scale output interface 11. The base portion 43 supports the platen 31, such as a portion of the weighing surface of the scale 9, which may provide a visual indication, such as a cross recess 35, to the technician of a center, or other desired portion, of an image to be captured by the image capture device 15. This allows a technician to properly position drug compounding related medications 37 and related supplies within the field of view of the image capture device 15, such as the image capture device enclosed within the housing 17 positioned above the platen 31 of the scale 9. In one configuration, as shown in FIGS. 4-6, an upper surface 41 of the platen 31 may define a plurality of recessed grooves 39 and/or protrusions extending from a surface of the platen 31 to frictionally restrain drug compounding related medications 37 and related supplies on the upper surface 41 of the platen 31. In another configuration, the upper surface 41 of the platen 31 may include a tackifier or other frictionally enhancing surface to similarly restrain drug compounding related medications 37 and related supplies on the upper surface 41 of the platen 31. The arrangement of grooves 39 and/or protrusions may easily indicate to a user the center of the platen 31 which may be arranged to coincide with the center of the field of view of the image capture device 15. The surface of the platen 31 may be coated with a durable composition that resists degradation caused by exposure to caustic agents, such as chemotherapy compounds and drugs, as well as cleaning agents, such as bleach, isopropyl alcohol, and the like. In certain configurations, the durable composition may be an epoxy or epoxy-based paint or coating.

The plurality of recessed grooves 39 and/or protrusions extending from a surface of the platen 31 may be configured to restrain any liquid material that is accidentally spilled on the upper surface 41 of the platen 31 during a compounding procedure. The plurality of recessed grooves 39 may define a receiving well 47 (shown in FIG. 1) which serves to collect and restrain accidentally spilled material in a confined area within the platen 31 until proper disposal techniques may be employed.

In another embodiment, the platen 31 may be removable from a base unit 43 of the scale 9. In this configuration, the platen 31 may be disposable and a technician may remove and dispose of the platen 31 after a single sterile drug compounding procedure. In this configuration, calibration of the scale 9 may be required for each individual platen 31 that is engaged with the base 43. In an alternative configuration, the platen 31 may include a disposable cover layer (not shown) which may be removed and disposed of after a sterile drug compounding procedure. The disposable aspect of the platen 31 ensures that prior to each compounding procedure, the platen 31 is clean and that no contaminates may transfer to a component of the drug compounding procedure. The platen 31 may be formed of a metal, composite, or polymeric material, as is conventionally known for scale weighing surfaces. In a further configuration, each platen 31 may include a unique individual identifier 45, embedded therein or attached to a surface thereof, which may be captured in an image captured by the image capture device 15. This allows for a technician and/or subsequent reviewer of the images captured by the image capture device 15 of the drug compounding procedure to verify that the platen 31 was changed between preparations. This may provide documented proof of a technician's compliance with institutional safety and sterility requirements. In certain configurations, the individual identifier 45 may be detected by the system software to determine whether the platen 31 has been replaced at a specified interval, for example, at a specified point during a shift, a day, a preparation and/or after contamination is detected. In a further configuration, the need for a user to change the platen 31 may be shown through the user interface 3, such as through a GUI. In a further configuration, the system may include safety features such that the user may be prevented from performing a compounding procedure until the platen 31 is replaced. A user may be prevented from preparing a sterile compounding procedure using the scale 9 and the platen 31 until the use duration of the platen 31 is confirmed to be within a compliance parameter.

In a further embodiment, the platen 31 may include an absorbent material which may absorb accidentally spilled material until proper disposal techniques may be employed. In a further configuration, at least one receiving well 47 of the platen 31 may include the absorbent material therein.

In certain situations, such as an aerosolation, it may be difficult for a technician to determine whether a cytotoxic material has been accidentally released from a container. Accordingly, the upper surface 41 of the platen 31 may include a coating layer which provides a visual indication, such as a color change, in response to fluid contacting the coating layer. In one configuration, the coating layer provides a visual indication in response to a leak or unintentional spill of material on the coating layer of the platen 31. The coating layer may be configured to provide a color change upon contact with a cytotoxic material. The visual indication may be visually observable to a technician or user of the system. In other configurations, the visual indication may be observable by the image capture device 15, or additional image capture device, such as an infrared camera.

In a further configuration, the platen 31 may be formed of a transparent and/or translucent material which permits passage of light therethrough. In this configuration, the base portion 43 of the scale 9 may also include a light source 49 for illuminating a portion of the platen 31, such as by passing light through the platen 31 from a location underneath the platen 31. This allows for enhanced visual inspection of drug compounding related medications 37 and related supplies to ensure they are free of defects. For example, the illuminated platen 31 may allow for a technician to visualize coring found in fluid filled IV bags. The light source 49 may be tuned to a certain wavelength appropriate to illuminate certain particles present within the drug compounding related medications 37. In a certain configuration, the platen 31 may include regions that are opaque or substantially opaque and regions that are transparent, substantially transparent, translucent, and/or substantially translucent in order to selectively allow for illumination of certain portions of the platen 31.

In another configuration, a scanner may be housed within the base portion 43 of the scale 9. The scanner may be a barcode scanner optically configured to scan barcode labels present on drug compounding related medications 37 through the translucent and/or transparent portions of the platen 31. The barcode scanner may be configured to obtain information from the barcodes to determine the contents of the vials placed on the platen 31. In a further configuration, a barcode writer or an integrated label printer may be positioned within the base portion 43 of the scale 9 to write information to the label of a drug compounding related medication 37 placed on the platen 31. In one configuration, the barcode writer may be configured to write information to the label of a drug compounding medication 37 pertaining to compounding results, date, time, lot numbers, and the like.

In yet a further configuration, the platen 31 may be in wireless communication with one or more system components. For example, a wireless interface may be provided in electrical communication with the platen 31 which may read and/or write data to a device provided on top of the platen 31. The wireless interface may be a Bluetooth connection to a pump connected to a drug vessel provided on the platen 31. Information transferred thereby may include pump operating parameters, such as patient specific flow rate and volumes. Accordingly, an automatically programmed device may be provided without requiring further user handling steps.

In yet a further configuration, the platen 31 may be configured to exhibit a visual indicator, such as a color change, when a weight measured by the scale 9 is within a specified tolerance. For example, the platen 31 may be equipped with an illuminated display which is activated once the scale 9 is stabilized and the unit measured is within a specified tolerance for a given drug compounding process.

In operation, the pharmacist/technician may be prompted through a series of display screens provided on the display of the user interface 3 to take the following steps. First, the operator may scan a first barcode with the barcode scanner 13 on a drug compounding related medication 37 including a drug to be reconstituted to prepare the prescribed pharmaceutical compound. The medication container may be placed on the scale 9 at the time of the scan, or a user may first scan the barcode and subsequently place the drug compounding related medication 37 on the platen 31 of the scale 9. Once the weight stabilizes, the system verifies, using a mathematical algorithm, that the measured weight is meeting the weight target plus/minus a predetermined tolerance. In addition, the image capture device 15 takes an image of the drug compounding related medication 37 and displays it to the user on the display of the user interface 3. The user then removes the drug compounding related medication 37 from the platen 31 and the image is saved to the data record of the drug preparation. If the system cannot verify that the measured weight is within that target weight tolerance, the technician is required to re-perform this step until the correct weight is achieved.

Next, the technician scans a second barcode of a fluid container of fluid that is to be mixed with the drug to be reconstituted. As discussed above, the medication container containing the fluid may be placed on the scale 9 at the time of the scan, or a user may first scan the barcode and subsequently place the drug compounding related medication 37 on the platen 31 of the scale 9. Once the weight stabilizes, the image capture device 15 takes an image of the drug compounding related medication 37 and displays it to the user on the display of the user interface 3. The user then removes the drug compounding related medication 37 and the image is saved to the data record of the drug preparation. Again, if the system cannot verify that the measured weight is within that target weight tolerance, the technician is required to re-perform this step until the correct weight is achieved.

Thereafter, the user mixes the drug to be reconstituted with the fluid in the fluid container, both drug compounding related medications 37, by injecting the fluid from the fluid container into the medication container. The medication container is then returned to the platen 31 of the scale 9 and the weight of the medication container is verified. Once the weight is stabilized and verified, the image capture device 15 automatically takes an image of the completed drug compounding related medication 37 based on a signal received from the scale and displays the image on the display of the user interface 3. If the system cannot verify that the measured weight is within that target weight tolerance, the technician is required to re-perform this step until the correct weight is achieved.

If the technician decides that any of the above-described images are not meeting certain requirements, there is the option to request a new or additional image. Requesting another picture may automatically switch the image capture device 15 into a "live video mode" displayed at the user interface 3. The technician can now move the medication container on the scale 9 to a preferred position and trigger the image capture through the user interface 3. As before, the captured image will be shown at the user interface 3 and by removing the item from the scale 9, the technician accepts the image and the system automatically moves to the next compounding step.

Once the drug preparation is complete, the system may optionally print a barcode label for placement on the completed drug preparation that includes encoded information representing the name of the pharmaceutical and patient information.

The pharmacy preparation system 1 may function in conjunction with several sequential computer-implemented modules for preparing and administering a prescribed fluidic compound, such as a chemotherapy compound. The modules each include code allowing for input from a user, generating output, and calculating and determining instructions for the preparation and administration of the pharmaceutical compound that may be implemented on one or more processors. More specifically, the modules may allow for a physician to enter a prescription for a patient that is subsequently verified for accuracy, prepared based on computer-aided instruction, verified based on a weight measurement, and administered to a patient. The modules may, during the drug preparation: (i) retrieve the prescription information data input by the physician in the CPOE module from the intra-hospital network; (ii) verify that the scanned barcode corresponds with the prescription information; (iii) determine if the weight of the syringe and/or IV bag is within a predetermined threshold accuracy level for the amount of the pharmaceutical to be administered; (iv) determine what adjustments must be made if the weight is not accurate; and (v) transmit data relating to the weight of the syringe and/or IV bag back to the intra-hospital network. These modules and processes may be implemented on several networked computing devices, or an independent computing device having its own processor where data and information is communicated between the computing devices using any suitable wired or wireless communication protocol, such as, but not limited to Ethernet, WiFi, cellular, Bluetooth, or the like.

Accordingly, the present invention guides a pharmacist or technician through the different compounding steps to prepare a medication order in a pharmacy by giving step-by-step instructions on a computer screen and verifying the different compounding steps by measuring the weight of the compounded liquids with a scale. The measured weight is then analyzed with a mathematical algorithm which checks if the necessary compounding accuracy has been accomplished. Every time an item is placed on the scale, a picture of the top of the scale is captured to create a visual documentation trail of the compounding process. The pictures are stored together with the recorded measurements from the scale and the algorithm results in a log file. If a measured weight of a drug is not in the predefined tolerance range of the expected weight, the software generates instructions to change the amount of the drug to bring it within the acceptable tolerance range. The software will not proceed to the next compounding step as long as the required tolerance of the present step has not been accomplished.

EXAMPLES

Figure 7:
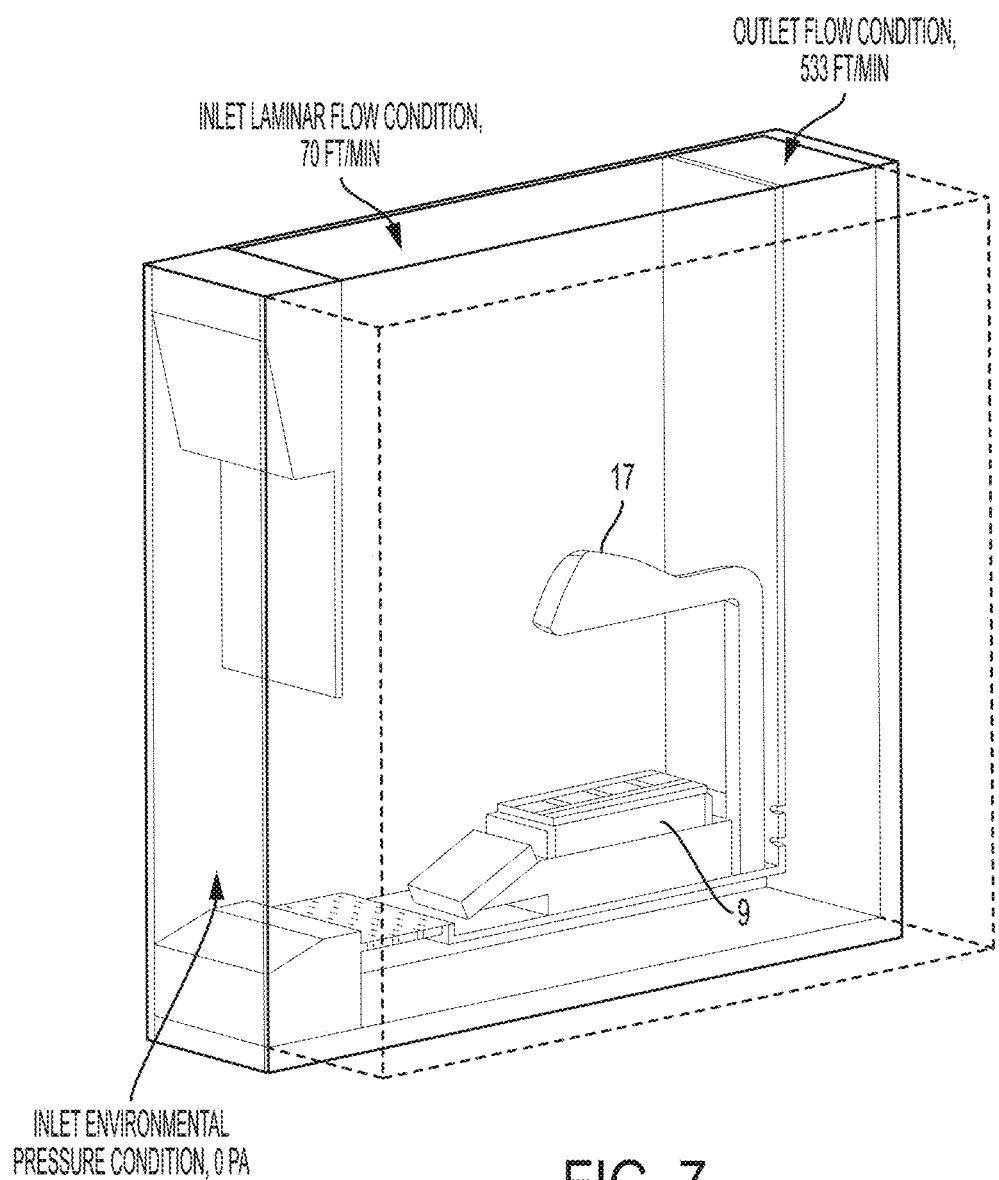
FIG. 7 is a perspective view of a flow hood system having an aerodynamically streamlined enclosure for input devices in accordance with an embodiment of the present invention.

Referring specifically to FIG. 7, a flow hood is shown having an inlet laminar flow condition of 70 ft/min and an outlet flow condition of 533 ft/min. The flow hood includes an inlet environmental pressure condition of 0 pa. The flow hood also includes a weighing surface of a scale and an enclosure that is being assessed. For purposes of modeling, a simplified half model environment is shown.

Referring to FIGS. 8A-13B, a series of computational fluid dynamic simulations are reflected showing the difference in airflow disturbance between different enclosure forms. For each of these figures, the flow trajectories and velocity contours were used as outputs and the identical environment, grid, and boundary conditions were used in each simulation. For each testing run, a 3 minute stability test was employed in which any oscillations that would occur in three minutes without being touched were documented. For the testing runs, a 100 g weight was used and 25 sample tests were run. The first stabilized value that the scale registered was recorded and two standard deviations were calculated and recorded as the accuracy.

FIGS. 8A-8B represent the air flow in a flow hood under idealized conditions with no enclosure present in the flow hood. The experimental assessment of the scale under these conditions was a stability of +/−0.00 g and an accuracy of +/−0.0229 g. To understand the design variables that are critical to scale stability, the typical airflow within a compounding hood, as shown in FIG. 8A, must be understood. In FIG. 8A, flow is directed from the top of the hood to the bottom and air exists in the two areas (seen in red) at the front and back of the hood. Near the platen of the scale, the air splits into alternative paths. With reference to FIG. 8B, since the enclosure housing is located above the scale, the enclosure housing is prone to create an airflow disturbance downstream which may result in scale instability and inaccuracy. Certain enclosure housing designs may be optimized to reduce this downstream airflow disturbance.

FIGS. 9A-9B represent the air flow in a flow hood with a large relatively blunt enclosure head present in the flow hood positioned above the scale. The experimental assessment of the scale under these conditions was a stability of +/−0.06 g and an unknown accuracy as the resulting scale readings were too unstable.

FIGS. 10A-10B represent the air flow in a flow hood with a medium sized relatively blunt enclosure head present in the flow hood positioned above the scale. The experimental assessment of the scale under these conditions was undetermined.

Figure 11A:
FIG. 11A is a perspective visual representation of the air flow distribution within a flow hood having a scale and a medium sized streamlined enclosure.
Figure 11B:
FIG. 11B is a side view visual representation of the air flow distribution within a flow hood having a scale and a medium sized streamlined enclosure.

FIGS. 11A-11B represent the air flow in a flow hood with a medium sized relatively streamlined enclosure head present in the flow hood positioned above the scale. The experimental assessment of the scale under these conditions was a stability of +/−0.02 g and an accuracy of +/−0.0445 g.

Figure 12A:
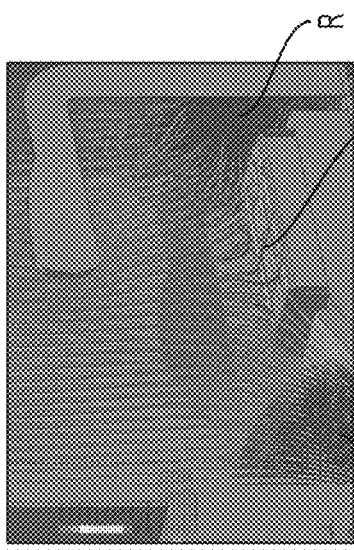
FIG. 12A is a perspective visual representation of the air flow distribution within a flow hood having a scale and a small sized streamlined enclosure.
Figure 12B:
FIG. 12B is a side view visual representation of the air flow distribution within a flow hood having a scale and a small sized streamlined enclosure.

FIGS. 12A-12B represent the air flow in a flow hood with a small sized very streamlined enclosure head present in the flow hood positioned above the scale. The experimental assessment of the scale under these conditions was a stability of +/−0.015 g and an accuracy of +/−0.0297 g.

Figure 13A:
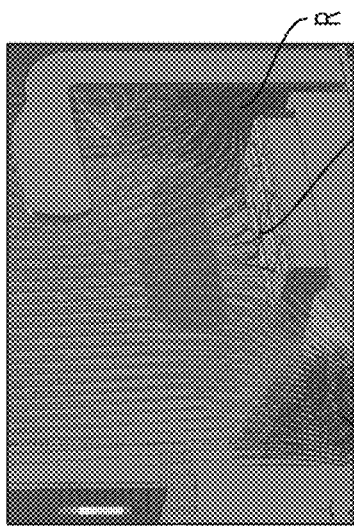
FIG. 13A is a perspective visual representation of the air flow distribution within a flow hood having a scale and a small sized shortened streamlined enclosure.
Figure 13B:
FIG. 13B is a side view visual representation of the air flow distribution within a flow hood having a scale and a small sized shortened streamlined enclosure.

FIGS. 13A-13B represent the air flow in a flow hood with a medium sized but shortened relatively streamlined enclosure head present in the flow hood positioned above the scale. The experimental assessment of the scale under these conditions was a stability of +/−0.01 g and an accuracy of +/−0.0153 g.

In each of FIGS. 8A-13B, the pressure and air speed of air within the flow hood is shown. The areas labeled B correspond to the smallest air speed and lowest pressure, corresponding to the least airflow disturbance. In contrast, the areas labeled R correspond to the greatest air speed and highest pressure, corresponding to the greatest airflow disturbance.

Figure 14:
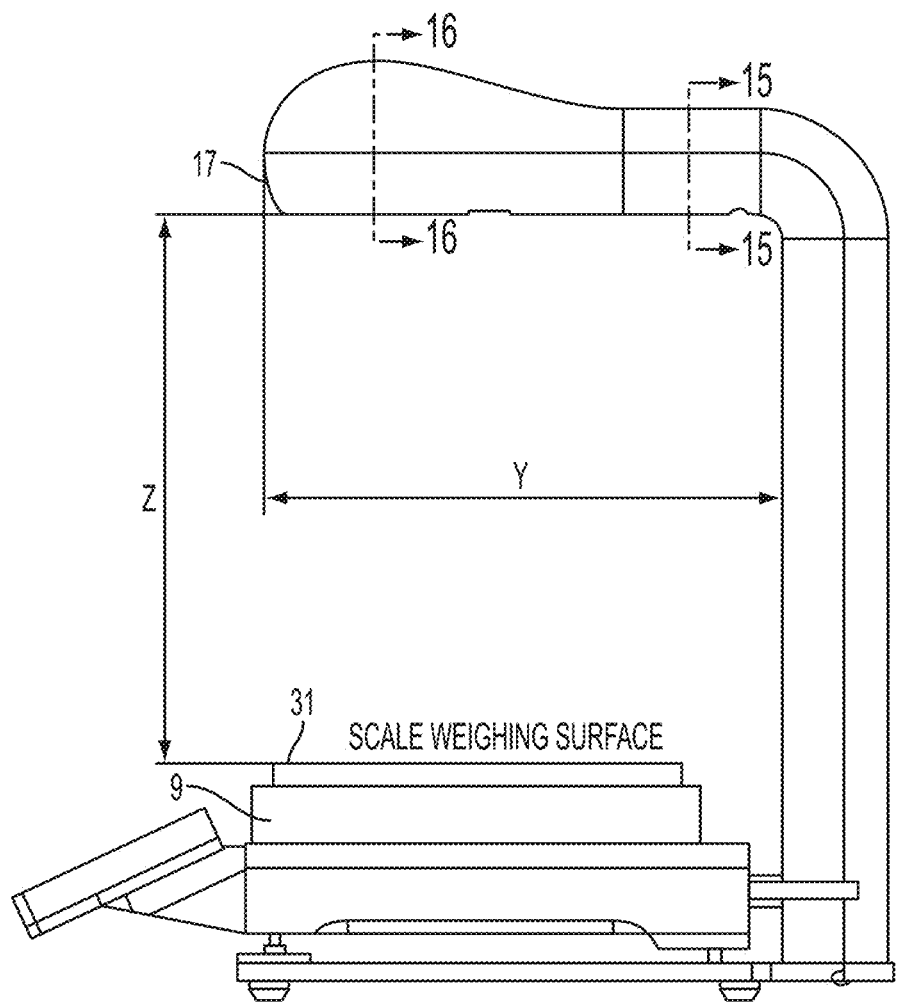
FIG. 14 is a side view of a scale and a housing enclosure in accordance with an embodiment of the present invention.
Figures 15, 16:
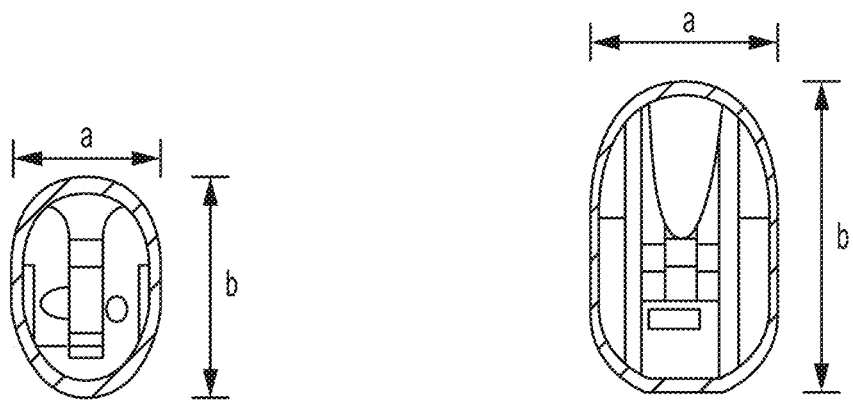
FIG. 15 is a cross-sectional view of the housing enclosure of FIG. 14 taken along line A-A.
FIG. 16 is a cross-sectional view of the housing enclosure of FIG. 14 taken along line B-B.

As shown in FIGS. 14-16, it is an objective of the present invention to minimize the quantity of turbulence that reaches the platen 31 of the scale 9. Maximizing the distance "Z" between the housing 17 and the platen 31 aids in allowing any disturbance created by the housing 17 to be swept toward the back of the hood prior to reaching the surface of the platen 31. Minimizing the distance "Y" aids in a similar fashion as this is directly related to the distance the disturbed air needs to travel prior to reaching the platen 31 of the scale 9. Minimizing "Y" and cross-sectional diameter a results in the smallest orthogonal area to the flow stream, thereby minimizing airflow disturbance. Maximizing the b/a cross-sectional ratio in conjunction with smooth curving of the housing 17 creates a streamlined profile in the direction of the flow stream. This will minimize the amount of air that becomes turbulent by gradually splitting the laminar airflow stream and subsequently allowing it to reconnect.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

The invention claimed is:

1. A system for preparing a pharmaceutical compound, comprising:
   a scale having a platen configured for placement of an object thereon;
   a supporting arm comprising a first end coupled to a portion of the scale and a second end extending to a position above the platen of the scale; and
   an enclosure housing comprising a first enclosure housing end and a second enclosure housing end, the first enclosure housing end attached to and extending from the second end of the supporting arm, the enclosure housing comprising dimensions such that
      a length defined by the first enclosure housing end and the second enclosure housing end is greater than a width of the enclosure housing and
      a height of each of the first and second enclosure housing end is greater than the width of the enclosure housing,
   the enclosure housing configured to house at least an image capture device,
   wherein the enclosure housing has a curved front profile and an upper portion comprising an upper surface having a portion that is concave along an axis defined by the first enclosure housing end and the second enclosure housing end, and
   wherein the height of at least a portion of the second end of the enclosure housing is greater than the height of at least a portion of the first end of the enclosure housing.

2. The system of claim 1, wherein the enclosure housing further comprises a lower portion attached to the upper portion, at least one of the upper portion or lower portion attached to and extending from the second end of the supporting arm.

3. The system of claim 1, wherein the second end of the enclosure housing extends over the platen of the scale, such that a field of view of the image capture device includes the platen.

4. The system of claim 1, wherein the enclosure housing further comprises a barcode scanner.

5. The system of claim 4, wherein the barcode scanner is angled with respect to the image capture device within the enclosure housing.

6. The system of claim 5, wherein the barcode scanner is angled at a 45° angle with respect to a field of view of the image capture device.

7. The system of claim 1, wherein the second end of the enclosure housing has a curved profile to minimize flow disturbance within a flow hood.

8. A system for preparing a pharmaceutical compound, comprising:
   a computing device comprising a processor and a user interface providing an operator with instructions for preparing the pharmaceutical compound;
   a scale operatively coupled to the processor of the computing device; and
   an enclosure housing comprising a first enclosure housing end and a second enclosure housing end and housing an image capture device and a barcode scanner, the enclosure housing supported at the first enclosure housing end by a supporting arm and coupled to a portion of the scale,
   wherein the image capture device is operatively connected to the processor of the computing device and has a field of view positioned to capture an object positioned on the scale,
   wherein the first enclosure housing end has a height that is less than a height of the second enclosure housing end and the height of each of the first and second enclosure housing end is greater than a width of the enclosure housing, and
   wherein the enclosure housing has a curved front profile and an upper portion comprising an upper surface having a portion that is concave along an axis defined by the first enclosure housing end and the second enclosure housing end.

9. The system of claim 8, wherein the barcode scanner is angled with respect to the image capture device within the enclosure housing.

10. The system of claim 9, wherein the barcode scanner is angled at a 45° angle with respect to the field of view of the image capture device.

11. The system of claim 8, wherein the enclosure housing is supported by the supporting arm such that the enclosure housing is positioned above the scale.

12. The system of claim 8, wherein the enclosure housing further comprises a lower portion attached to the upper portion, and wherein the upper portion of the enclosure housing has a convex profile relative to a top surface of the scale.

13. A system for preparing a pharmaceutical compound, comprising:
   a computing device comprising a user interface providing an operator with instructions for preparing the pharmaceutical compound; and
   a flow hood having positioned therein:
      a scale operatively connected to the user interface; and
      an enclosure housing comprising a camera positioned to capture an image of the scale during the preparation of the pharmaceutical compound, the enclosure having a width and a height, and wherein along an entire length of the enclosure, the enclosure height is greater than the enclosure width,
   wherein the enclosure housing has a curved front profile and an upper surface having a portion that is concave along an axis defined by the first enclosure housing end and the second enclosure housing end, and
   wherein the height of at least a portion of the second end of the enclosure housing is greater than the height of at least a portion of the first end of the enclosure housing.

14. The system of claim 13, wherein the enclosure housing is positioned above the scale.

15. The system of claim 13, wherein the enclosure housing further comprises a barcode scanner.

16. The system of claim 15, wherein the barcode scanner is angled with respect to the camera within the enclosure housing.

17. The system of claim 16, wherein the barcode scanner is angled at a 45° angle with respect to a field of view of an image capture device.

* * * * *